United States Patent [19]

Coder et al.

[11] Patent Number: 4,532,801

[45] Date of Patent: Aug. 6, 1985

[54] METHOD AND APPARATUS FOR DETERMINING SMALL MAGNITUDE FLUID-DYNAMIC DRAG RESISTANCE DIFFERENTIALS BETWEEN DIFFERENT STRUCTURAL CONFIGURATIONS OF A MODEL

[75] Inventors: David W. Coder, Bethesda; Benjamin B. Wisler, Jr., Cabin John; Albert P. Clark, Bethesda; Raymond J. Ratcliffe, Silver Spring, all of Md.

[73] Assignee: The United States of America as represented by the Secretary of the Navy, Washington, D.C.

[21] Appl. No.: 611,444

[22] Filed: May 17, 1984

[51] Int. Cl.$^3$ .................. G01M 9/00; G01N 33/00
[52] U.S. Cl. .................................. 73/432 R; 73/148; 73/147
[58] Field of Search ............... 73/148, 147, 432 J, 73/432 R

[56] References Cited

U.S. PATENT DOCUMENTS

| | | | |
|---|---|---|---|
| 2,065,496 | 12/1936 | Adams . | |
| 2,612,776 | 10/1952 | Klas | 73/147 |
| 2,791,240 | 5/1957 | Storms, Jr. et al. | 73/147 X |
| 2,795,137 | 6/1957 | Whitener | 73/147 |
| 2,799,460 | 7/1957 | Hastings | 73/147 X |
| 2,935,870 | 5/1960 | Lyons, Jr. | 73/147 |
| 3,020,754 | 2/1962 | Swanson | 73/147 |
| 3,052,120 | 9/1962 | Goodman et al. | 73/148 |
| 3,455,155 | 7/1969 | Greenberg et al. | 73/147 |
| 3,460,383 | 8/1969 | Padera | 73/147 |
| 3,509,763 | 5/1970 | Tabeling et al. . | |
| 3,561,264 | 2/1971 | Needham et al. | 73/147 |
| 3,620,076 | 11/1971 | Heyson | 73/147 |
| 3,695,101 | 10/1972 | Hanson | 73/147 |
| 3,916,813 | 11/1975 | Stahl | 73/148 X |
| 4,207,764 | 6/1980 | Wallace | 73/147 |

FOREIGN PATENT DOCUMENTS

| | | | |
|---|---|---|---|
| 102130 | 6/1983 | Japan | 73/148 |
| 204634 | 1/1968 | U.S.S.R. | 73/147 |
| 226209 | 1/1969 | U.S.S.R. | 73/147 |
| 508711 | 5/1976 | U.S.S.R. | 73/432 J |
| 522097 | 9/1976 | U.S.S.R. | 73/148 |
| 548480 | 5/1977 | U.S.S.R. | 73/148 |

OTHER PUBLICATIONS

"Adaptable Wind Tunnel Walls for 2D and 3D Model Tests", Conference: ICAs Proceedings, 1980; Oct. 1980; pp. 808-816; U. Ganzer.

Primary Examiner—Stewart J. Levy
Assistant Examiner—Tom Noland
Attorney, Agent, or Firm—Luther A. Marsh; Robert F. Beers

[57] ABSTRACT

A method and apparatus for determining small magnitude fluid-dynamic drag resistance differentials between different structural configurations of a variable model mounted in an environmental test facility. The variable model has disposed therein a configuration conversion mechanism to convert the variable model from a baseline configuration to a modified baseline configuration, i.e., the baseline configuration with a minor structural modification superimposed thereon, and vice versa, a nulling force mechanism to apply a nulling force to the variable model to null out the total fluid-dynamic drag resistance acting thereon, i.e., return the variable model to an undeflected position, and a system for measuring the deflections of the variable model caused by the small magnitude fluid-dynamic drag resistance differentials acting thereon. The variable model is mounted in the environmental test facility, and a predetermined fluid flow is initialized and stabilized. An initial deflection of the variable model due to the total fluid-dynamic drag resistance acting thereon is nulled out by applying the nulling force to the variable model through the nulling force mechanism. The variable model is then alternately converted to the baseline configuration and the modified baseline configuration by remote actuation of the configuration conversion mechanism, and the small magnitude fluid-dynamic drag resistance differentials acting thereon are determined by measuring the deflections of the variable model by the measuring system. The efficacy of the minor structural modification to the variable model may then be assessed by comparing the small magnitude fluid-dynamic drag resistance differentials of the different configurations.

12 Claims, 6 Drawing Figures

METHOD AND APPARATUS FOR DETERMINING SMALL MAGNITUDE FLUID-DYNAMIC DRAG RESISTANCE DIFFERENTIALS BETWEEN DIFFERENT STRUCTURAL CONFIGURATIONS OF A MODEL

BACKGROUND OF THE INVENTION

1. Field of the Invention

This invention relates to a method and apparatus for determining fluid-dynamic drag resistance experienced by a model in an environmental test facility, and more particularly, to a method and apparatus for determining small magnitude fluid-dynamic drag resistance differentials in an environmental test facility between a baseline model and the baseline model with a minor external structural modification superimposed thereon.

2. Description of the Prior Art

The baseline configurations of the external structures of most air and water operated vehicles have been fairly well stabilized such that the basic fluid-dynamic drag resistance characteristics of these vehicles are established. It has been noted, however, that the drag resistance characteristics of these vehicles change slightly when minor structural modifications are superimposed upon the external structure of the basic vehicle configuration. For example, a ship appendage may have different shapes or an aircraft may have different leading or trailing edge configurations of its airfoils. Other examples of possible structural modifications which affect the drag resistance characteristics of a vehicle include smoothing of exterior surfaces, changing the size, shape and/or location of control surfaces, filling in cavities and gaps, and filleting of appendage-main body intersections. A single modification superimposed upon the basic vehicle configuration, or combinations of these modifications superimposed upon the basic vehicle configuration can provide a marked reduction in drag resistance which can result in significant savings in energy consumption over the lifetime of the vehicle and a beneficial increase in the operating parameters of the vehicle.

Conventional design methodology investigates the effects of proposed structural modifications by the construction and testing of models representing the basic vehicle configuration and the basic vehicle configuration as altered by the proposed structural modifications. Inasmuch as the hereinabove delineated modifications to the basic vehicle configuration produce changes in magnitude in the fluid-dynamic drag resistance experienced by the models tested in an environmental test facility which are small in relation to the total fluid-dynamic drag resistance experienced by the models, it is difficult to determine the total drag resistance with sufficient accuracy to accurately assess the magnitude of these small changes in drag resistance effected by the hereinabove delineated structural modifications. Therefore, it is desirable to have the capability to independently determine small changes in magnitude of fluid-dynamic drag resistance in order to obtain data for inputting to various cost versus payoff studies.

Conventional model experimental methodology involves the separate measurements of the total fluid-dynamic drag resistance of a baseline model and the total fluid-dynamic drag resistance of the baseline model with the proposed structural modification, and then mathematically comparing the results to ascertain the effected change in drag resistance. The drag resistance of a model may be represented in the form:

$$Cd = Cd\{Rn, Fn, \text{Geometry}\}$$
where
$$Cd = D/(qA) \text{ and } q = 0.5\,\rho V^2$$

$$Fn = V/\sqrt{gL}$$

$$Rn = VL/\nu$$

and Cd is the drag coefficient, Fn is the Froude number, Rn is the Reynolds number, D is the drag resistance, q is the dynamic pressure, A is a characteristic area of the model such as wetted area or cross-sectional area, V is the free stream velocity, $\nu$ is the kinematic viscosity of the fluid, $\rho$ is the density of the fluid, and "Geometry" is the external structural configuration of the model. The models are placed in an environmental test facility and subjected to predetermined experimental operating conditions so that the total fluid-dynamic drag resistance of each model may be ascertained, and then mathematically compared to determine if the proposed structural modification is efficacious in reducing drag resistance. Methods for designing such environmental tunnel experiments are outlined in C. Lipson, N.J. Sheth, "Statistical Design and Analysis of Engineering Experiments", McGraw-Hill Book Co., New York, N.Y. (1973), and H. Schenck Jr., "Theories of Engineering Experimentation", McGraw-Hill Book Co., New York, N.Y. (1961). As long as the measured difference in drag resistance is sufficiently greater than the uncertainty in the measurements, these methods will yield statistically significant results.

Uncertainty is an estimate of the error, i.e., the difference between a measured value and the true value for a given experimental datum, which consists of a fixed, or bias, error and a random, or precision, error. Uncertainties in environmental test facility experimental data enter into the measurements and are propagated through all parameters, and these uncertainties may be calculated according to ASME standards. See S.J. Kline, F.A. McClintock, "Describing Uncertainties in Single-Sample Experiments", Mechanical Engineering, ASME (January 1953), and R. Abernathy, "Measurement Uncertainty for Fluid Flow in Closed Conduits", ASME (1982), for discussions regarding uncertainties and their effect on experimental data. The ASME standard for reporting mean data with an uncertainty band, i.e., a confidence interval, is:

$$X \pm U$$
and $$U = B + t95^*S/\sqrt{N} \text{ or}$$

$$U = (B + (t95^*S/\sqrt{N}))$$

where X is the mean value of the experimental data, U is the uncertainty, B is the bias error, t95 is the 95th percentile point for the two-tailed t-distribution which is approximately equal to two for a large number of samples, S is an estimate of the standard deviation of the population, N is the number of samples, and t95*S is the precision error expressed as the half-width of the confidence interval about the true mean. By analyzing the results of some high quality, conventional drag resistance experiments, it was determined that these types of experiments could be expected to produce statistically significant drag resistance differentials between models differing only by minor structural modifications down to only about one percent of the total fluid-dynamic drag resistance at a ninety-five percent confidence level. For additional details, see D.A. Sandell, "Statistical Design of Experiments for Submarine Speed Improvement Program", Report No. CGARD-04-77 (August 1977). For the types of structural modifications delineated hereinabove, the magnitude of the fluid-dynamic drag resistance differential between the baseline model and the baseline model with the proposed structural modification superimposed thereon is less than one percent of the total fluid-dynamic drag resistance. Hence, conventional model experimental methodology is inadequate for accurately determining the magnitude of the fluid-dynamic drag resistance differentials for the hereinabove delineated structural modifications, i.e., when the fluid-dynamic drag resistance differentials of concern are less than one percent of the total fluid-dynamic drag resistance experienced by the models, the uncertainty in the measurements of the experimental data results in fluid-dynamic drag resistance differentials which are not statistically significant. To generate fluid-dynamic drag resistance differentials which are statistically significant, conventional model experimental methodology must reduce both the precision error and the bias error. The precision error may be reduced by utilizing higher precision equipment, i.e., reducing S, and/or making more measurements, i.e., reducing $t_{95}$ towards two and increasing N in the denominator of the precision error component of the uncertainty factor. This approach, however, results in increased costs due to the use of higher precision equipment and the increase in environmental test facility usage time. Furthermore, conventional model experiments require the fabrication of a multiplicity of models, the baseline model plus one baseline model for each proposed structural modification which is being considered which significantly increases the cost of conventional test facility methodology. Precision fabrication, to minimize structural deviations among models, also increases the cost of utilizing the methodology of conventional model experiments in determining small magnitude fluid-dynamic drag resistance differentials. Conventional model experimental hardware/methodology makes the reduction of bias errors to a value of less than one percent, such that fluid-dynamic drag resistance differentials of a magnitude of less than one percent of the total fluid-dynamic drag are statistically significant, improbable. It is often noted that bias errors arising from conventional model experimental methodology using the same experimental hardware under repetitive fluid flow conditions are much greater than one percent.

SUMMARY OF THE INVENTION

The present invention surmounts the inherent disadvantages of the prior art by providing a method and apparatus such that statistically significant small magnitude fluid-dynamic drag resistance differentials are determined by means of a "relative" experiment, i.e., an experiment in which a baseline model and the baseline model with the proposed structural modification superimposed thereon are tested near the same time under the same test conditions. By conducting the test in this manner, the bias error does not change significantly between the fluid-dynamic drag resistance measurements and tends to drop out when the difference between the measurements is computed.

A variable model representing the vehicle under consideration is suspended by flexures from a box beam disposed within an environmental test facility. The variable model is equipped with a configuration conversion mechanism disposed internally in the variable model proximal the site on the external structure for the proposed structural modification. The configuration conversion mechanism is remotely actuated and is capable of rapidly converting the variable model between a baseline configuration state and a modified baseline configuration state. The baseline configuration is a structural model of the external configuration of the vehicle as it presently exists. The modified baseline configuration is a structural model of the external configuration of the vehicle as it presently exists, with a minor structural modification superimposed thereon which is postulated will reduce the total fluid-dynamic drag resistance of the vehicle. The flexures supporting the variable model allow the deflection of the model due to the drag resistance encountered, and are instrumented with calibrated strain gauges which function to measure the deflection thereof to provide an alternate drag resistance measuring means. Calibrated linear voltage differential transducers cooperate with the variable model and function as the primary means for measuring the deflection of the variable model due to fluid-dynamic drag resistance. A nulling force mechanism is disposed within the beam and cooperates with the variable model to counteract, or null, the total fluid-dynamic drag resistance experienced by the variable model.

The variable model is disposed in the environmental test facility by means of the flexures and the configuration conversion mechanism is set such that the variable model is in the baseline configuration state, i.e., the baseline configuration is exposed to the fluid flow conditions in the environmental test facility. Prior to initiating fluid flow over the variable model in the environmental test facility, the calibrated linear voltage differential transducers and strain gauges are initialized to zero readings. The fluid flow velocity in the environmental test facility is then brought up to a predetermined operating condition and the variable model is deflected due to its total fluid-dynamic drag resistance. The nulling force mechanism is then actuated to apply a force to the variable model which counteracts the total fluid-dynamic drag resistance, thus causing the flexures to assume an undeflected position. This causes the calibrated linear voltage differential transducers and strain gauges to reposition to a null, or zero, reading. It is to be understood that this is an idealized condition, whereas in reality there will be some residual deflection in the flexures so that the linear differential transducers and strain gauges will read approximately near zero. Data measurements are then taken on the baseline configuration. The configuration conversion mechanism is then actuated to convert the variable model to the modified baseline configuration. After a predetermined settling period has elapsed, which allows the fluid flow around the variable mode to come to a stable condition, data measurements are taken on the modified baseline configuration. Since the environmental test facility is running at constant, steady state conditions, and since the total fluid-dynamic drag resistance effecting the baseline configuration has been nulled out by the nulling force mechanism, the readings of the calibrated linear voltage differential transducers are indicative of the fluid-dynamic drag resistance differential between the baseline configuration and the modified baseline configuration.

Accordingly, it is a primary object of the present invention to provide a novel method and apparatus for accurately determining small magnitude fluid-dynamic drag resistance differentials acting on a variable model in an environmental test facility.

Another object of the present invention is to provide a novel method and apparatus which permits fluid flow testing in an environmental test facility at approximately the same time under the same test conditions of a variable model capable of being converted to different external structural configurations.

Still another object of the present invention is to provide a novel method and apparatus wich obviates the bias error effect when determining small magnitude fluid-dynamic drag resistance differentials acting on a variable model in an environmental test facility.

Yet another object of the present invention is to provide a novel method and apparatus which produces statistically signficant fluid-dynamic drag resistance differential values with a ninety-five percent confidence interval for a variable model undergoing fluid flow testing in an environmental test facility when these values are approximately 0.1 percent of the total fluid-dynamic drag resistance experienced by the variable model.

Still a further object of the present invention is to provide an apparatus for countacting the fluid-dynamic drag resistance acting on a variable model in an environmental test facility such that only the small magnitude fluid-dynamic drag resistance differential values are determined.

Yet a further object of the present invention is to provide an apparatus for rapid conversion of a variable model in an environmental test facility from a baseline configuration to a modified baseline configuration such that different external structural configurations of the variable model can be tested at approximately the same time under the same test conditions.

Still one more object of the present invention is to provide an apparatus capable of measuring fluid-dynamic drag resistance differentials which are statistically significant when the value thereof is approximately 0.1 percent of the total fluid-dynamic drag resistance experienced by the variable model.

BRIEF DESCRIPTION OF THE DRAWINGS

A more complete understanding of the present invention and the attendant advantages and features thereof will be more readily appreciated as the same becomes better understood by reference to the following detailed description when considered in conjunction with the accompanying drawings wherein.

DETAILED DESCRIPTION OF THE PREFERRED EMBODIMENT

Figure 1:
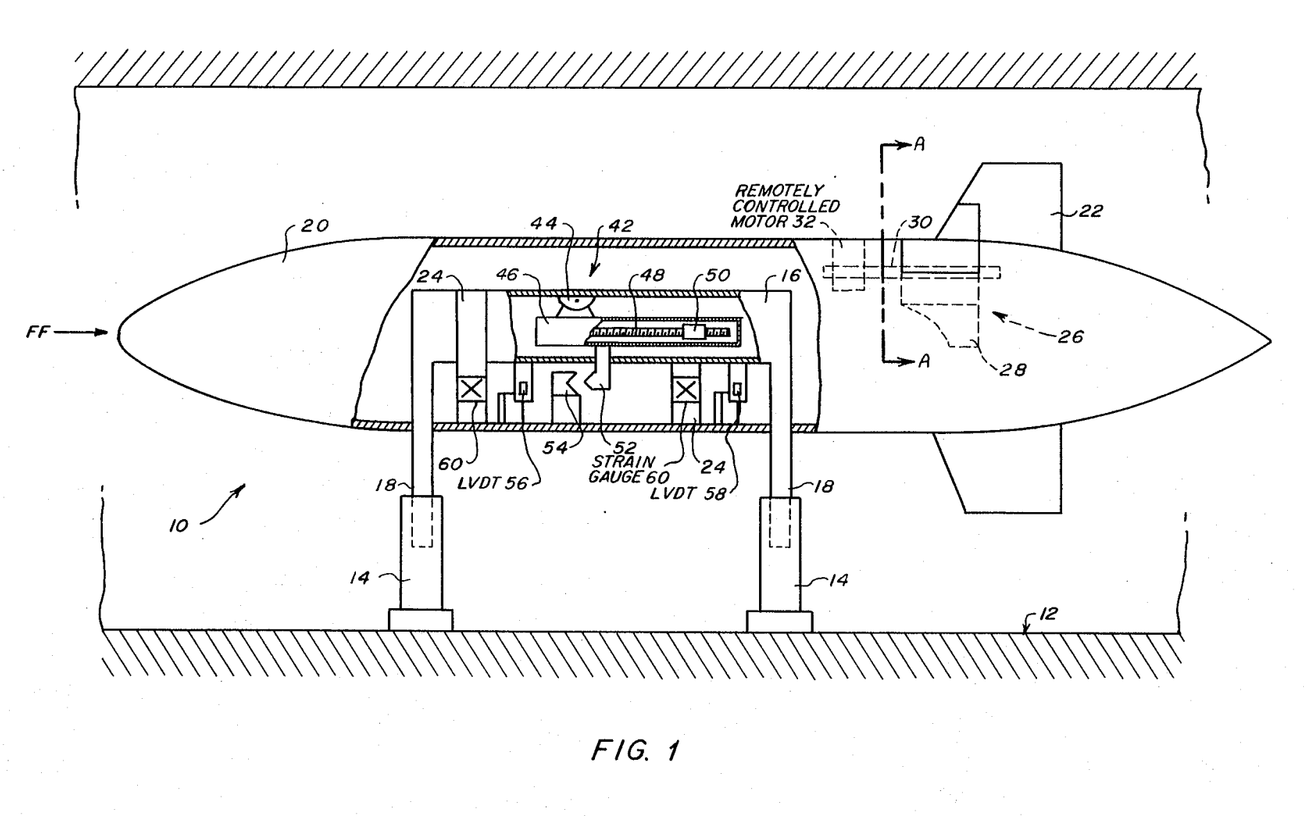
FIG. 1 is a partially cutaway variable model according to the present invention mounted in an environmental test facility.

Referring now to the drawings, wherein like reference numerals designate similar or corresponding elements throughout the several views, there is shown generally in FIG. 1 a partially cutaway variable model 10 mounted in an environmental test facility 12. The environmental test facility 12 may be a wind tunnel, a water tunnel or a towing tank. The variable model 10 depicted in FIG. 1 is a model of an external hull configuration having an outer hull 20 and an appendage 22 projecting therefrom. It is to be understood that the use of a model of an external hull configuration as the variable model 10 throughout the several views is by way of illustration only of the method and apparatus of the present invention, and the scope of the present invention is not limited thereby. Two mounts 14 are rigidly secured to the floor of the environmental test facility 12. At least one conduit (not shown) is provided within at least one of the mounts 14 and functions to provide a control, powering and instrumentation interconnect between the interior of the variable model 10 and the exterior of the environmental test facility 12. A hollow box beam 16 is rigidly connected to the mounts 14 by means of struts 18 integrally extending from the box beam 16. The box beam 16 functions as the support structure for the variable model 10 in the environmental test facility 12. The hollow box beam 16 also has disposed therein a nulling force mechanism 42 described hereinbelow, and control, powering and instrumentation elements and continuity means (not shown). A conduit (not shown) is included in at least one of the struts 18 and is interconnected with the at least one conduit of the mounts 14 and functions to provide control, powering and instrumentation continuity between the control, powering and instrumentation elements, described hereinbelow, disposed within the interior of the variable model 10 and the exterior of the environmental test facility 12. The control, powering and instrumentation elements are disposed within the interior of the variable model 10 so as to be mounted at the axis of rotation thereof and coiled in such a manner so as not to produce interference forces or moments with the nulling force mechanism. The variable model 10 is mounted in the environmental test facility 12 by suspending the model 10 from four flexures 24 (only two are shown in FIG. 1), with the flexures 24 secured to the hollow box beam 16 and the interior surface of the hull 20 of the variable model 10. The flexures 24 function to permit the friction-free suspension of the variable model 10 within the environmental test facility 12 and to accomodate the deflection of the variable model 10 when it experiences fluid-dynamic drag resistance generated by fluid flow thereover. For the variable model 10 described hereinbelow, the four flexures 24 were designed to have an approximate range of deflection of ±0.025 mm (±0.010 inches). Slots (not shown) are provided in the projecting appendage 22 and the hull 20 of the variable model 10 for passage of the struts 18 therethrough. The slots are of such dimensions that the struts 18 and the variable model 10 maintain a spaced apart relationship under all operating conditions of the environmental test facility 12. This slot configuration ensures the unimpeded deflection of the variable model 10 due to the fluid-dynamic drag resistance on the variable model 10 caused by fluid flow in the environmental test facility 12, thereby ensuring accuracy in the fluid-dynamic drag resistance determination.

Figure 2A:
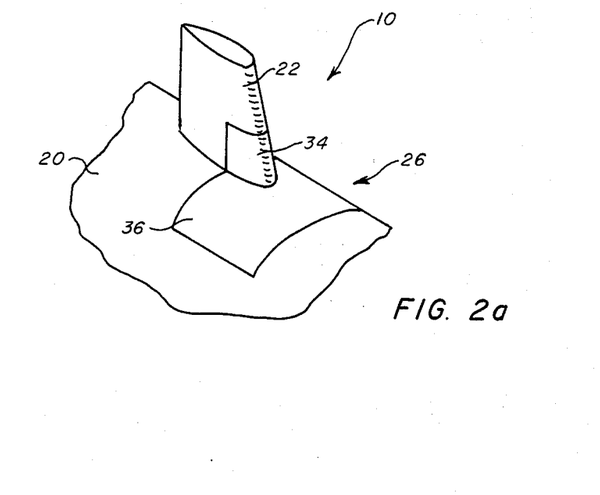
FIG. 2a is a partial perspective view of the variable model in a baseline configuration state.
Figure 2B:
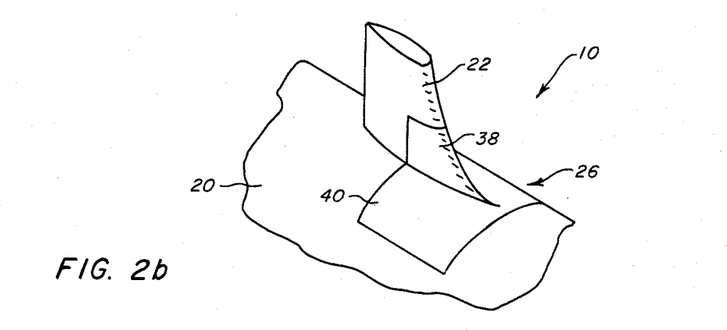
FIG. 2b is a partial perspective view of the variable model in a modified baseline configuration state.
Figure 2C:
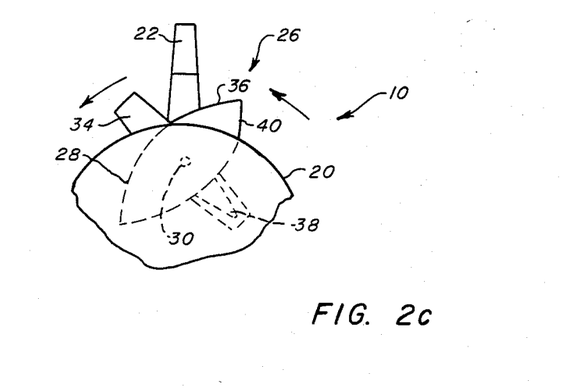
FIG. 2c is a partial axial view taken along line A—A of FIG. 1 showing a schematic representation depicting the transition of the variable model from the baseline configuration state to the modified baseline configuration state.
Figure 3:
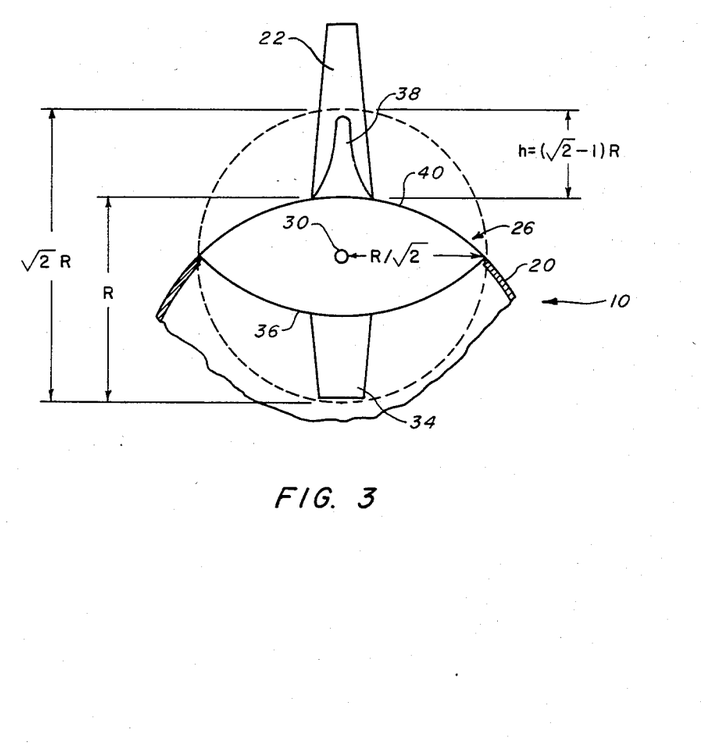
FIG. 3 depicts the geometric constraints of the configuration conversion mechanism with respect to the variable model of the preferred embodiment.

A configuration conversion mechanism 26 is shown in FIG. 1 and FIGS. 2a, 2b and 2c, and generally comprises a rotatable member 28, a shaft 30 disposed along the centerline of the rotatable member 28 and having ends thereof rotatably secured to the interior wall of the variable model 10, and a remotely controller motor 32 cooperating with the shaft 30 to rapidly rotate the rotatable member 28 so as to efficaciously convert the variable model 10 from a baseline configuration state to a modified baseline configuration state and vice versa. By way of illustration only of the method and apparatus of the present invention, the proposed fluid-dynamic drag resistance reduction modification for the vehicle under consideration, as embodied by the variable model 10 representing an external hull, involves the structural interface between the leading edge of the projecting appendage 22 and the outer hull 20. The baseline configuration of the variable model 10, as shown in FIG. 2a, has an unfilleted segment 34 on the leading edge of the projecting appendage 22 such that there is an angular interface between the unfilleted segment 34 and a first hull segment 36. The modified baseline configuration of the variable model 10, as shown in FIG. 2b, has a filleted segment 38 on the leading edge of the projecting appendage 22 such that there is a gradually-curved interface between the filleted segment 38 and a second hull segment 40. The configuration conversion mechanism 26 is rotatably mounted on the interior wall of the outer hull 20 of the variable model 10 proximal the leading edge of the projecting appendage 22 so that when the configuration conversion mechanism 26 is actuated the rotatable member 28 is rotated to interface either the unfilleted segment 34 and the first hull segment 36, or the filleted segment 38 and the second hull segment 40, with the projecting appendage 22 and the outer hull 20, respectively. Both the first hull segment 36 and the second hull segment 40 of the rotatable member 28 are precision machined so that the exterior surfaces of the first and second hull segments 36, 40 interface smoothly and continuously with the exterior surface of the outer hull 20 of the variable model 10 when it is in the baseline configuration state and the modified baseline configuration state, respectively. Similarly, the unfilleted segment 34 and the filleted segment 38 are precision machined so that the exterior surfaces of the unfilleted segment 34 and the filleted segment 38 interface smoothly and continuously with the exterior surface of the projecting appendage 22 when the variable model 10 is in the baseline configuration state and the modified baseline configuration state, respectively. The smooth and continuous interfacing of the segments of the configuration conversion mechanism 26 with the variable model 10 ensures that the small magnitude fluid-dynamic drag resistance differentials determined during fluid flow testing result from the structural modification of the variable model 10 rather than from uncoordinated surface dissimilarities of the variable model 10. Where appendages, such as the unfilleted segment 34 and the filleted segment 38 described hereinabove, protrude from the exterior surface of the rotatable member 28 of the configuration conversion mechanism 26, the structural geometry of the variable model 10 proximal the mounting site of the configuration conversion mechanism 26 constrains the geometry of the proposed structural modification. For the preferred embodiment of the variable model 10 described hereinabove, the geometric constraints for the configuration conversion mechanism 26 are depicted in FIG. 3. Where the radius of the outer hull 20 at the leading edge of the projecting appendage 22 is R, the rotatable member 28 has a radius of rotation about the shaft 30 of $R/\sqrt{2}$. Based upon this, the maximum height for an appendage protruding from the surface of the rotatable member 28 is $(\sqrt{2}-1)R$. The axial length of the rotatable member 28, i.e., the axial length of the first and second hull segments 36, 40, will depend upon the curvature and the resulting axial length of the filleted segment 38.

A nulling force mechanism 42 is disposed within the hollow box beam 16, and as shown in the preferred embodiment of FIG. 1, is mounted to the top of the hollow box beam 16 by means of a flexural pivot 44, which functions to provide a means of friction free mounting in contrast to a sliding mounting surface which has frictional contact. The nulling force mechanism 42 comprises a casing 46, lead screws 48 disposed within the casing 46, weights 50 affixed to the lead screws 48 distal the flexural pivot 44, a knife-edged member 52 secured to the casing 46, a self-aligning V-block 54 secured to the interior wall of the outer hull 20 of the variable model 10 at such a position that the self-aligning V-block 54 is aligned with and can selectively engage the knife-edged member 52, and a remotely actuated motor (not shown) adapted to rotate the lead screws 48 in both a clockwise and counterclockwise direction so that the relative position of the weights 50 with respect to the flexural pivot 44 can be varied. The relative displacement of the weights 50 with respect to the flexural pivot 44 causes a change in the magnitude of the clockwise moment of the weights 50 about the flexural pivot 44. The magnitude of the clockwise moment is transmitted by the knife-edged member 52 as a nulling force to the self-aligning V-block 54. Since the self-aligning V-block 54 is secured to the variable model 10, the nulling force counteracts the deflection of the variable model 10 due to the fluid-dynamic drag resistance caused by the fluid flow in the environmental test facility 12, indicated by arrow FF in FIG. 1, over the variable model 10. The magnitude of the nulling force, for the preferred embodiment described hereinabove, is adjustable over a range of approximately 0 to 700N (0 to 175 lbf), and the nulling force is repeatable and precise over the estimated range of deflection of the four flexures 24, approximately ±0.025 mm (±0.010 inches). The maximum precision error in the nulling force over this estimated range of deflection, considering factors such as jack screw backlash, flexural pivot torque, flexural pivot hysteresis, jack screw deflection, etc., which affect the magnitude of the nulling force, is estimated to be less than 0.054N (0.014 lbf).

The deflection of the variable model 10, caused by the fluid-dynamic drag resistance, is determined primarily by means of at least one calibrated linear voltage differential transducer 56, which was selected for its friction free measurement capability. For the preferred embodiment depicted in FIG. 1 with an estimated range of deflection of 0.025 mm (0.010 inches), two calibrated linear voltage differential transducers 56, 58 are utilized. The first transducer 56 is calibrated to measure deflections over the range from 0 to 0.025 mm (0.010 inches) while the second transducer 58 is calibrated to measure deflections over the range from 0 to 0.125 mm (0.050 inches). The linear voltage differential transducers 56, 58 are mounted by affixing the cores of the transducers 56, 58 to the inside surface of the outer hull 20 of the variable model 10 with the casings of the transducers 56, 58 attached to the hollow box beam 16. Calibrated strain gauges 60 are mounted on the flexures 24 and function as an alternate means of measuring the deflection of the variable model 10 due to the fluid-dynamic drag resistance.

Figure 4:
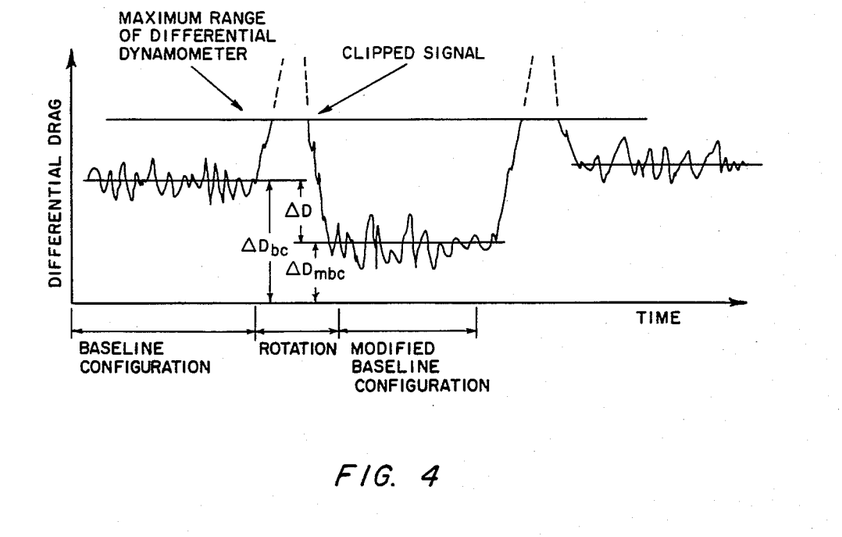
FIG. 4 is a graph showing a qualitative analog signal representing the small magnitude fluid-dynamic drag resistance differentials versus time as the variable model is converted from the baseline configuration state to the modified baseline configuration state and vice versa.

The apparatus described hereinabove is utilized to determine small magnitude fluid-dynamic drag resistance differentials experienced by the variable model 10. The variable model 10, fitted with the configuration conversion mechanism 26, is suspended from the hollow box beam 16 by means of the four flexures 24 having calibrated strain gauges 60 mounted thereon. The conversion configuration mechanism 26 is constructed so that the variable model 10 can be converted from the baseline configuration state to the modified baseline configuration state and vice versa, the modified baseline configuration state comprising a minor structural modification to the baseline configuration state, such as the filleted segment 38 and the second hull segment 40 as depicted in FIG. 2b, which has been postulated will reduce the total fluid-dynamic drag resistance of the variable model 10. The calibrated linear voltage differential transducers 56, 58 are mounted as described hereinabove, and the knife-edged member 52 and the self-aligning V-block 54 of the nulling force mechanism 42 are aligned such that when the nulling force mechanism 42 is remotely actuated the knife-edged member 52 selectively engages the self-aligning V-block 54 to transmit the nulling force to the variable model 10. The knife-edged member 52 is initially positioned in a spaced apart relationship with respect to the self-aligning V-block 54 so that the variable model 10 is freely deflectable when fluid flow is initiated in the environmental test facility 12. The calibrated linear voltage differential transducers 56, 58 and the calibrated strain gauges 60 are zeroed out so that there are indications of zero deflection in the flexures 24 prior to initiating fluid flow in the environmental test facility 12. Fluid flow in the direction of arrow FF is then initiated in the environmental test facility 12 and stabilized at predetermined experimental conditions. Fluid flow at the predetermined experimental conditions causes an initial deflection of the variable model 10 in the direction of arrow FF due to the fluid-dynamic drag resistance (D) experienced thereby. The nulling force mechanism 42 is then actuated to transmit the nulling force (F) to the self-aligning V-block 54 secured to the variable model 10 by means of the knife-edged member 52 such that the deflection and strain in the flexures 24 are nulled out, i.e., $D - F \cong 0$. As mentioned hereinabove, this is only an approximation for actual testing conditions inasmuch as there will be a very, very small residual deflection in the flexures 24 so that the knife-edged member 52 remains in contact with the self-aligning V-block 54. Concomitantly, there will be small drag resistance reading reflected on the linear voltage differential transducers 56, 58 and/or the strain gauges 60. Therefore it is to be understood that reference to a nulled out condition is by way of approximation only. The fluid flow in the environmental test facility 12 is maintained at the predetermined experimental conditions and the variable model 10 is alternately converted from the baseline configuration state to the modified baseline configuration state and vice versa by the configuration conversion mechanism 26. Actuation of the configuration conversion mechanism 26 alternately rotates the unfilleted segment 34 and the first hull segment 36, and the filleted segment 38 and the second hull segment 40, of the rotatable member 28 into exposure to the experimental fluid flow conditions in the environmental test facility 12. Since the initial deflection of the variable model 10 has been nulled out by the nulling force mechanism 42, i.e., $D - F \cong 0$, the calibrated linear voltage differential transducers 56, 58 and the calibrated strain gauges 60 will measure deflections caused by small magnitude fluid-dynamic drag resistance differentials, i.e., $D - F = \Delta \text{small}$, due to the minor structural differences between the two aspects of the configuration conversion mechanism 26, the unfilleted segment 34 and the first hull segment 36 versus the filleted segment 38 and the second hull segment 40. The change in fluid-dynamic drag resistance between the baseline configuration state and the modified baseline configuration state of the variable model 10 is then calculated by:

$$\Delta D = Dbc - Dmbc \\ = (Dbc - F) - (Dmbc - F) \\ = \Delta Dbc - \Delta Dmbc$$

where $\Delta D$ is the change in fluid-dynamic drag resistance, Dbc is the drag resistance in the baseline configuration state, i.e., unfilleted segment 34 and first hull segment 36 exposed to the fluid flow conditions, Dmbc is the drag resistance in the modified baseline configuration state, i.e., filleted segment 38 and second hull segment 40 exposed to the fluid flow conditions, F is the nulling force, $\Delta Dbc$ is the fluid-dynamic drag resistance differential for the baseline configuration, and $\Delta Dmbc$ is the fluid-dynamic drag resistance differential for the modified baseline configuration. The change in fluid-dynamic drag resistance is converted to coefficient form using the measured experimental fluid flow variables and a characteristic area by:

$$\Delta Cd = \Delta D/(qA)$$

where $\Delta Cd$ is the coefficient of drag resistance change, q is the dynamic pressure in the environmental test facility 12, and A is a characteristic area such as appendage profile area, model surface area or model cross-sectional area. The variable model 10 is repeatedly converted from the baseline configuration state to the modified baseline configuration state and vice versa, and fluid-dynamic drag resistance differential measurements taken in each state as shown in FIG. 4 until sufficient data is accumulated so that a statistically significant drag resistance change coefficient is obtained. The foregoing calculations may be done real time as the test proceeds, along with a statistical analysis based upon the uncertainty equation presented in the "Background of the Invention" section, to ensure that sufficient data points are accumulated so that the drag resistance change coefficient is statistically significant, and to provide an estimate of its magnitude and uncertainty in the form of a confidence level. As shown in FIG. 4, the rotation of the rotatable member 28 of the configuration conversion mechanism 26 to convert the variable model 10 from the baseline configuration state to the modified baseline configuration state and vice versa produces fluid-dynamic drag resistance differentials which exceed the range of the linear voltage differential transducers 56, 58 such that a mechanical stop (not shown) must be provided to limit the excursion of the variable model 10. FIG. 4 also shows that a short settling time must elapse after each rotation of the rotatable member 28 to allow the experimental fluid flow conditions to stabilize so that a valid fluid-dynamic drag resistance differential determination can be made. FIG. 4 also illustrates the fact that the fluid-dynamic drag resistance differentials deviate about a mean value due to small fluctuations in the experimental fluid flow conditions.

Thus, the method and apparatus of the present invention as described hereinabove provides an improved means for the accurate determination of small magnitude fluid-dynamic drag resistance differentials between a baseline configuration of a model and the same baseline configuration model with a minor structural modification superimposed thereupon. The present invention eliminates the need to rely on the difference between the total fluid-dynamic drag resistance measurements between two different models to ascertain the fluid-dynamic drag resistance differential therebetween. The present invention also eliminates the need for repeatability of the experimental fluid flow conditions in the environmental test facility during measurements of the total fluid-dynamic drag resistance. The apparatus of the present invention is simple in design, thereby making it inexpensive to fabricate and easy to use.

Obviously, numerous modifications and variations of the present invention are possible in light of the above teachings. It is therefore to be understood that within the scope of the appended claims, the present invention may be practiced otherwise than as specifically described hereinabove.

What is claimed as new and desired to be secured by Letters Patent of the United States is:

1. An apparatus for determining small magnitude fluid-dynamic drag resistance differentials acting on a variable model mounted in an environmental test facility, said environmental test facility including means for mounting said variable model therein, comprising:
   a configuration conversion mechanism disposed within said variable model and cooperating therewith to alternately convert said variable model to a baseline configuration and a modified baseline configuration;
   a nulling force mechanism disposed within said variable model and cooperating with said variable model and said mounting means to be selectively apply a nulling force to said variable model to null out a total fluid-dynamic drag resistance acting on said variable model due to a predetermined fluid flow in said environmental test facility such that said variable model is returned to an undeflected position; and
   means for measuring deflections of said variable model caused by said small magnitude fluid-dynamic drag resistance differentials acting thereon, said measuring means being disposed within said variable model and cooperating with said variable model and said mounting means, whereby after said predetermined fluid flow is initialized and stabilized in said environmental tunnel and said nulling force is applied to said variable model by said nulling force mechanism to return said variable model to said undeflected position, said variable model is alternately converted to said baseline configuration and said modified baseline configuration and said small magnitude fluid dynamic drag resistance differentials acting thereon to cause deflections of said variable model are measured by said deflection measuring means.

2. The apparatus for determining small magnitude fluid-dynamic drag resistance differentials as claimed in claim 1 wherein said configuration conversion mechanism further comprises:
   a rotatable body disposed within said variable model having first and second external segments alternately interfacing with an external surface of said variable model, said first external segment of said rotatable body interfacing with said external surface of said variable model to define said baseline configuration and said second external segment of said rotatable body interfacing with said external surface of said variable model to define said modified baseline configuration,
   such that said variable model is alternately converted to said baseline configuration and said modified baseline configuration by rotating said rotatable body to alternately interface said first external segment of said rotatable body with said external surface of said variable model and said second external segment of said rotatable body with said external surface of said variable model, respectively.

3. The apparatus for determining small magnitude fluid-dynamic drag resistance differentials as claimed in claim 2 wherein said configuration conversion mechanism further comprises:
   a shaft positioned along a centerline of said rotatable body and having ends thereof rotatably secured to an interior surface of said variable model; and
   a remotely controlled motor disposed within said variable model and cooperating with said shaft for rotation thereof such that remote actuation of said remotely controlled motor causes rotation of said shaft to rotate said rotatable body to alternately interface said first external segment of said rotatable body with said external surface of said variable model and said second external segment of said rotatable body with said external surface of said variable model.

4. The apparatus for determining small magnitude fluid-dynamic drag resistance differentials as claimed in claim 1 wherein said nulling force mechanism further comprises:
   a flexural pivot associated with said mounting means;
   at least one lead screw pivotally secured to said flexural pivot;
   a weight associated with said at least one lead screw and adapted to be remotely positioned therealong to generate a moment of said weight about said flexural pivot;
   a knife-edged member associated with said at least one lead screw and adapted to transmit said moment of said weight about said flexural pivot as said nulling force; and
   a self-aligning V-block slidingly secured to an interior surface of said variable model and positioned to selectively engage said knife-edged member, such that said total fluid-dynamic drag resistance acting on said variable model due to said predetermined fluid flow in said environmental test facility is selectively nulled out by remotely positioning said weight along said at least one lead screw to generate said moment of said weight about said flexural pivot, said moment being transmitted by said knife-edged member to said self-aligning V-block as said nulling force to return said variable model to said undeflected position.

5. The apparatus for determining small magnitude fluid-dynamic drag resistance differentials as claimed in claim 1 wherein said means for measuring deflections of said variable model further comprises at least one calibrated linear voltage differential transducer, said at least one calibrated linear voltage differential transducer having a first part rigidly secured to said mounting means and a second part rigidly secured to an interior surface of said variable model so that said at least one calibrated linear voltage differential transducer measures said deflections of said variable model due to said small magnitude fluid-dynamic drag resistance differentials acting thereon.

6. The apparatus for determining small magnitude fluid-dynamic drag resistance differentials as claimed in claim 1 wherein said means for measuring said deflections of said variable model further comprises at least one calibrated strain gauge, said at least one calibrated strain gauge cooperating with said mounting means so that said deflections of said variable model due to said small magnitude fluid-dynamic drag resistance differentials acting thereon are measured by said at least one calibrated strain gauge.

7. The apparatus for determining small magnitude fluid-dynamic drag resistance differentials as claimed in claim 1 wherein said means for measuring deflections of said variable model further comprises:
  at least one calibrated linear voltage differential transducer having a first part rigidly secured to said mounting means and a second part rigidly secured to an interior surface of said variable model; and
  at least one calibrated strain gauge cooperating with said mounting means,
  such that said deflections of said variable model due to said small magnitude fluid-dynamic drag resistance differentials acting thereon are measured by said at least one calibrated linear voltage differential transducer and said at least one calibrated strain gauge.

8. An apparatus for determining small magnitude fluid-dynamic drag resistance differentials acting on a variable model mounted in an environmental test facility, said environmental test facility including means for mounting said variable model therein, comprising:
  a configuration conversion mechanism disposed within said variable model and cooperating therewith to alternately convert said variable model to a baseline configuration and a modified baseline configuration, said configuration conversion mechanism further comprising
    a rotatable body disposed within said variable model having first and second external segments alternately interfacing with an external surface of said variable model, said first external segment of said rotatable body interfacing with said external surface of said variable model to define said baseline configuration and said second external segment of said rotatable body interfacing with said external surface of said variable model to define said modified baseline configuration, and
    means for rotating said rotatable body disposed within said variable model, said rotating means adapted to be remotely actuated,
    such that remote actuation of said rotating means causes alternating conversion of said variable model to said baseline configuration and said modified baseline configuration due to alternate rotation of said rotatable body to interface said first external segment thereof with said external surface of said variable model and said second external segment of said rotatable body with said external surface of said variable model, respectively;
  a nulling force mechanism disposed within said variable model and cooperating with said variable model and said mounting means, said nulling force mechanism further comprising
    a flexural pivot associated with said mounting means,
    at least one lead screw pivotally secured to said flexural pivot,
    a weight associated with said at least one lead screw and adapted to be remotely positioned therealong to generate a moment of said weight about said flexural pivot,
    a knife-edged member associated with said at least one lead screw and adapted to transmit said moment of said weight about said flexural pivot as a nulling force, and
    a self-aligning V-block slidingly secured to an interior surface of said variable model and positioned to selectively engage said knife-edged member,
    such that a total fluid-dynamic drag resistance acting on said variable model due to a predetermined fluid flow in said environmental test facility is nulled out by remotely positioning said weight along said at least one lead screw to generate said moment of said weight about said flexural pivot, said moment being transmitted by said knife-edged member to said self-aligning V-block as said nulling force to return said variable to an undeflected position; and
  at least one calibrated linear voltage differential transducer having a first part rigidly secured to said mounting means and a second part rigidly secured to said interior surface of said variable model, said at least one calibrated linear voltage differential transducer measuring deflections of said variable model due to said small magnitude fluid-dynamic drag resistance differentials acting thereon caused by said predetermined fluid flow in said environmental test facility,
  whereby after said predetermined fluid flow in said environmental test facility is initialized and stabilized and said nulling force is applied to said variable model by said nulling force mechanism to return said variable model to said undeflected position, said variable model is alternately converted to said baseline configuration and said modified baseline configuration and said small magnitude fluid-dynamic drag resistance differentials acting thereon to cause said deflections of said variable model are measured by said at least one calibrated linear voltage differential transducer.

9. A method for determining small magnitude fluid-dynamic drag resistance differentials acting on a variable model, comprising:

mounting said variable model in an environmental test facility, said variable model having a configuration conversion mechanism and a nulling force mechanism disposed therein;

initializing and stabilizing a predetermined fluid flow in said environmental test facility;

deflecting said variable model to a deflected position due to a total fluid-dynamic drag resistance acting on said variable model caused by said predetermined fluid flow thereover;

transmitting a nulling force from said nulling force mechanism to said variable model to null out said total fluid-dynamic drag resistance acting thereon so as to return said variable model to an undeflected position;

converting said variable model from a baseline configuration to a modified baseline configuration and vice versa by remote actuation of said configuration conversion mechanism; and determining said small magnitude fluid-dynamic drag resistance differentials acting on said variable model in said baseline configuration and said modified baseline configuration.

10. The method for determining small magnitude fluid-dynamic drag resistance diffentials as claimed in claim 9 wherein said step of transmitting a nulling force further comprises:

positioning a weight on a lead screw to generate a moment of said weight about a flexural pivot;

transforming said moment of said weight about said flexural pivot to said nulling force acting through a knife-edged member; and coupling said nulling force from said knife-edged member to a self-aligning V-block slidingly secured to an interior surface of said variable model to null out said total fluid-dynamic drag resistance acting on said variable model so as to return said variable model to said undeflected position.

11. The method for determining small magnitude fluid-dynamic drag resistance differentials as claimed in claim 9 wherein said step of converting said variable model further comprises:

rotating a rotatable body to interface a first external segment thereof with an external surface of said variable model, thereby defining said baseline configuration;

rotating said rotatable body to interface a second external segment thereof with said external surface of said variable model, thereby defining said modified baseline configuration; and repeating said steps of rotating said rotatable body a predetermined number of times.

12. The method for determining small magnitude fluid-dynamic drag resistance differentials as claimed in claim 9 wherein said step of determining said small magnitude fluid-dynamic drag resistance differentials further comprises:

measuring a first deflection of said variable model in said baseline configuration due to said predetermined fluid flow thereover;

measuring a second deflection of said variable model in said modified baseline configuration due to said predetermined fluid flow thereover; and repeating said steps of measuring said first deflection and measuring said second deflection a predetermined number of times.

* * * * *